3,334,965
PROCESS FOR PRODUCING ALUMINA WHISKERS
Arno Gatti, Norristown, Pa., and John H. Untiedt, Schenectady, N.Y., assignors to General Electric Company, a corporation of New York
No Drawing. Filed Nov. 7, 1963, Ser. No. 322,037
1 Claim. (Cl. 23—142)

This invention relates to the enhanced production of alumina whiskers or fibers and more particularly to a process for enhancing the growth of alumina whiskers.

Technological developments in recent years have placed increasing emphasis on the discovery of new materials capable of combining strength and heat resistance. Progress has proceeded in many directions, laminated or fiber reinforcing being one such direction; for example, it has been found that whiskers of metal oxides may be valuable reinforcing agents in various types of matrix materials.

As disclosed in the copending application of Arno Gatti, entitled, "Apparatus for Growing Whiskers," Ser. No. 138,101, filed Sept. 14, 1961, and assigned to the same assignee as the present invention, alumina whiskers, among others, can be grown continuously so that the large quantities needed can be obtained. It is apparent that in most instances, the stronger the reinforcing agent used in a grain matrix, then the stronger is the overall composite.

It is a principal object of this invention to provide a process for enhancing production of $Al_2O_3$ whiskers, especially those which are oriented in the crystallographic "C" orientation.

Other objects and advantages of this invention will be in part obvious and in part explained by reference to the accompanying specification.

Broadly, the present invention concerns itself with a process for increasing the growth rate of alumina whiskers which are produced by vapor phase deposition procedures and one which improves the obtention of "C" type whiskers.

The enhanced growth of alumina whiskers can be obtained by utilizing the apparatus and general process conditions described in the Gatti application referred to earlier in this specification. In that application, alumina whiskers, as well as other metal whiskers, are grown by providing a molten source of metal which is then carried by means of a suitable atmosphere and deposited in whisker form on a growth substrate. In the specific case of alumina, a source of molten aluminum is provided within an enclosed chamber and exposed to a hydrogen atmosphere having a dew point no higher than about $-50°$ F. Some water vapor is provided in the hydrogen atmosphere so that oxidation of the vaporized aluminum will occur and provide for the deposition and growth of alumina whiskers on the growth substrate. The growth substrate can be either a stationary body or preferably is in the form of a rotating drum upon which whisker growth occurs continuously.

The present invention represents an improvement over that described in the aforesaid Gatti application since it magnifies the growth of alumina whiskers, especially the "C" type. The production of greater numbers of the particular whiskers in this orientation is achieved by providing in the hydrogen atmosphere, which carries the vaporized alumina, a small but effective amount of sulfur, the sulfur probably providing an effective poisoning of those growth sites which ordinarily would lead to plate-like growths rather than to whisker growth. It is probable that the sulfur is present in the atmosphere in the form of hydrogen sulfide ($H_2S$), although it need not be added to the atmosphere in this form. For example, elemental sulfur can be placed within the growth chamber in the presence of the hydrogen atmosphere so that some production of hydrogen sulfide will naturally occur. Obviously, sulfur-containing compounds which will dissociate at the temperature at which crystal growth is occurring, specifically within the range of 1300 to 1600° F., will also be suitable. Aluminum sulfate, $Al_2(SO_4)_3$, is an example of one such compound which will dissociate at growth temperatures to free the sulfur necessary to promoting the growth of alumina whiskers. It has been found that from $\frac{1}{10}$ to about $\frac{1}{2}$ weight percent sulfur based on the alumina present is completely effective in providing the amount necessary to enhance the growth of the alumina whiskers and especially those oriented in the "C" direction.

Alumina whiskers having the desired "C" type orientation have been produced by placing within an enclosed chamber 25 to 50 gram charges of aluminum together with $\frac{1}{10}$ to $\frac{1}{2}$ weight percent sulfur and heating the two materials in the presence of a hydrogen atmosphere having a dew point no higher than $-50°$ F. to a temperature within the range of 1300 to 1600° F. Whiskers oriented in the "C" direction were obtained which ranged from about .5 to 40 microns in size, although the specific size of whiskers obtained depends upon the length of time that growth is permitted to continue.

It is apparent from the preceding that the present invention has provided an improved process for producing alumina whiskers and specifically one wherein alumina whiskers oriented in the crystallographic "C" direction are obtained.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claim.

What we claim as new and desire to secure by Letters Patent of the United States is:

A process for enhancing the growth of alumina whiskers comprising, vaporizing aluminum at temperatures of from about 1300 to 1600° C. in a hydrogen atmosphere having a dew point no higher than about $-50°$ F., providing from one-tenth to one-half weight percent sulfur based on the amount of aluminum in the hydrogen atmosphere to promote whisker growth, and providing a growth substrate on which whiskers of $Al_2O_3$ will grow.

References Cited

UNITED STATES PATENTS

| | | | |
|---|---|---|---|
| 3,011,870 | 12/1961 | Webb et al. | 23—142 |
| 3,216,794 | 11/1965 | Roschuk | 23—142 |
| 3,240,560 | 3/1966 | Spear | 23—142 |

FOREIGN PATENTS 608,032  11/1960  Canada.

OSCAR R. VERTIZ, *Primary Examiner.*
H. T. CARTER, *Assistant Examiner.*